United States Patent [19]

Okamura et al.

[11] 4,232,868
[45] Nov. 11, 1980

[54] STATIONARY RECORD PLAYER

[75] Inventors: Yasushi Okamura; Kiichiro Tanaka, both of Fukuoka, Japan

[73] Assignee: Matsushita Electric Industrial Co., Ltd., Osaka, Japan

[21] Appl. No.: 952,389

[22] Filed: Oct. 18, 1978

[30] Foreign Application Priority Data

| Oct. 19, 1977 | [JP] | Japan | 52-126266 |
| Oct. 19, 1977 | [JP] | Japan | 52-126267 |
| Oct. 19, 1977 | [JP] | Japan | 52-126268 |
| Feb. 20, 1978 | [JP] | Japan | 53-18963 |
| Mar. 6, 1978 | [JP] | Japan | 53-25568 |
| Mar. 23, 1978 | [JP] | Japan | 53-33864 |
| Mar. 24, 1978 | [JP] | Japan | 53-34455 |

[51] Int. Cl.³ ............................................. G11B 3/40
[52] U.S. Cl. ................................. 274/9 C; 274/15 R
[58] Field of Search ............ 274/9 C, 13 R, 14, 15 R; 360/97, 101, 117

[56] References Cited

U.S. PATENT DOCUMENTS

| 3,224,782 | 12/1965 | Isemara | 274/9 C |
| 3,484,111 | 12/1969 | Staar | 274/9 C |
| 3,638,954 | 2/1972 | Kato | 360/101 |
| 3,825,268 | 7/1974 | Holland et al. | 274/9 C |
| 3,952,170 | 4/1976 | Irvin et al. | 360/101 |

FOREIGN PATENT DOCUMENTS

| 38-14878 | 8/1963 | Japan | 274/9 C |
| 46-7767 | 2/1971 | Japan | 274/9 C |

Primary Examiner—John W. Shepperd
Attorney, Agent, or Firm—Stevens, Davis, Miller & Mosher

[57] ABSTRACT

A stationary record player is described having a turn table adapted to be rotatably driven by an electric motor. A pickup is pivotally secured to the turn table, the pickup having a stylus which moves along the recording groove of a stationary record medium when the pickup is rotated together with the turn table whereby the signal on the record medium is reproduced. The record player comprises a lift member adapted to detect the arrival of the stylus at the final position of reproduction, the lift member including a lift lever being pivoted to the turn table. One end of the lift lever is held by the pickup until the pickup reaches a final inward position whereby the one end is released allowing the remaining end of the lift lever to be pivoted upward. A play lever for operating a switch for supplying current to the electric motor is locked during play, and when the stylus reaches the final playing position, an activating arm of the locking mechanism is moved by the remaining end of the lift lever to release the lift lever stopping the electric motor.

10 Claims, 14 Drawing Figures

STATIONARY RECORD PLAYER

BACKGROUND OF THE INVENTION

The present invention relates to a stationary record player and, more particularly, an automatic stationary record player having various functions.

Such a record player has been known as being adapted to be placed on a stationary record disc stuck to a picture book or the like printed matter, so as to reproduce the signal record in the record medium. This type of record player is generally referred to as a stationary record player.

This type of record player, however, has no means adapted to stop the playing operation automatically upon detection of the completion of the playing of one record. Thus, in the prior stationary record player, it is necessary to manipulate a stop button, when the playing of one record is completed as well as when it is desired to stop the playing operations. Therefore, if the manipulation of the stop button is missed upon the completion of the playing, the playing operation is continued without making reproduction of signals, so as to unnecessarily wear the stylus record medium. At the same time, in the prior stationary record player, the playing operation is continued even when the player happens to be turned or when the player is moved away from the record medium. If the player in the playing condition is erroneously placed on an other object than the record medium, e.g. a desk or the like, the stylus runs on the surface of the object, so as to be seriously damaged. For the same reason, if a person happens to put his hand in contact with the lower surface of the player, the hand may be dangerously scratched by the stylus.

Further, in the prior stationary record player, it is necessary to provide a spring which always biases the pickup or the pickup support radially outwardly, i.e. toward the outside of the disk, for ensuring the resetting of the player to the starting condition after the playing. Consequentlly, a large bias force is applied to the pickup radially outwardly, even during the playing. At the same time, since the pickup is rotated together with the turn table, the pickup is biased radially outwardly also by a centrifugal force. These forces inconveniently hinder the pickup in the smooth movement toward the inside of the turn table.

At the same time, in the prior stationary record player, the arrangement is such that the push button for actuating the play-start switch should be locked in the depressed condition during the suspension of the playing. For starting the playing the push button for the play-start switch is unlocked by being further depressed and then allowed to push out by a predetermined stroke, so as to cause the pickup to drop onto the surface of the record disc. This manner of operation is quite contrary to the operation of the ordinary push-button type record player in which the playing is started by depressing the push button and the lifting and resetting of the pickup is caused by the release of the push button. Therefore, such manner causes quite an awkward manipulation in use.

In addition, in the prior stationary record player, the pause operation in the record playing is made by interrupting the power supply to the motor and amplifier circuit, while keeping the stylus in contact with the record disc. Therefore, when the record player is removed from the record disc while the player is in the pause state, the stylus is kept in the projected condition and, therefore, is easily damaged.

SUMMARY OF THE INVENTION

It is therefore an object of the invention to provide a stationary record player capable of overcoming the aforementioned problem in the prior stationary record player having no means for automatically stopping the operation upon the detection of the completion of the playing.

It is another object of the invention to provide a stationary record player in which the radially outward biasing force exerted by the resetting spring is effectively negated during the playing, so as to ensure the smooth movement of the pickup toward the inside of the turn table.

It is still another object of the invention to provide a stationary record player which can offer an easy manipulation in use to the user, in connection with the push button manipulation.

To this end, according to the invention, there is provided a stationary record player having a turn table adapted to be rotatively driven by an electric motor or the like, and a pickup pivotally secured to the turn table, the pickup having a stylus adapted to scan a stationary record medium as the pickup is rotated together with the turn table, so as to reproduce the signal recorded on the record medium, characterized by comprising a lift member adapted to detect the arrival of the stylus at the final position of reproduction, and an automatic stopping mechanism adapted to release a play lever from a locked state in response to the operation of the lift member so as to automatically bring the player into the suspended condition.

These and other objects, as well as advantageous features of the invention will become clear from the following description of the preferred embodiments taken in conjunction with the accompanying drawings.

BRIEF DESCRIPTION OF THE DRAWINGS

FIGS. 9-10 show top elevations of the player,
FIGS. 11a-12b shows the reversing mechanism.

DESCRIPTION OF THE PREFERRED EMBODIMENTS

Figure 1:
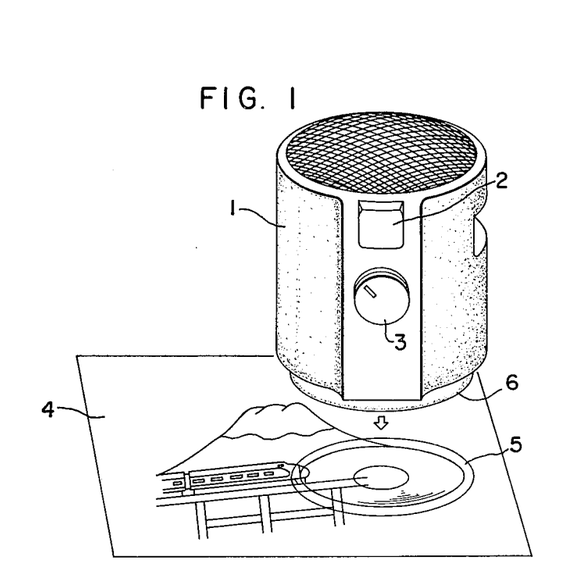
FIG. 1 shows the stationary record player.
Figure 2:
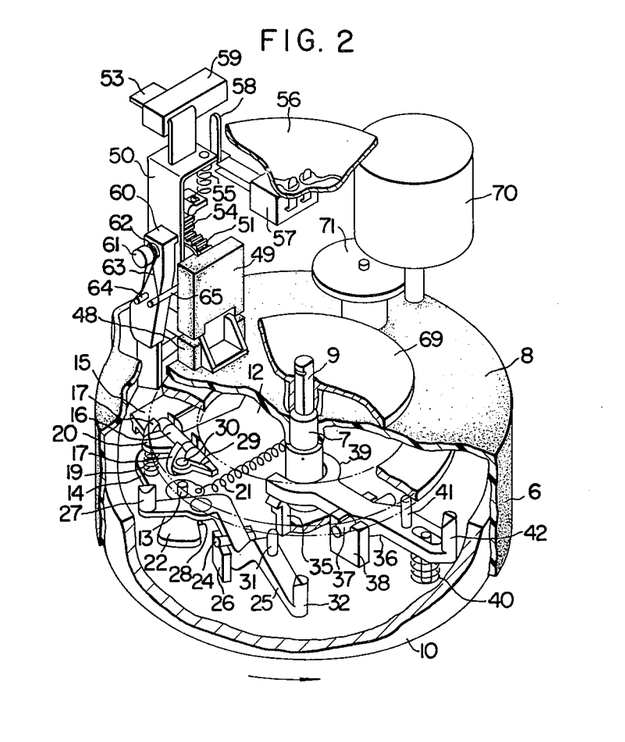
FIG. 2 shows the stationary record player with parts cut away.
Figure 3:
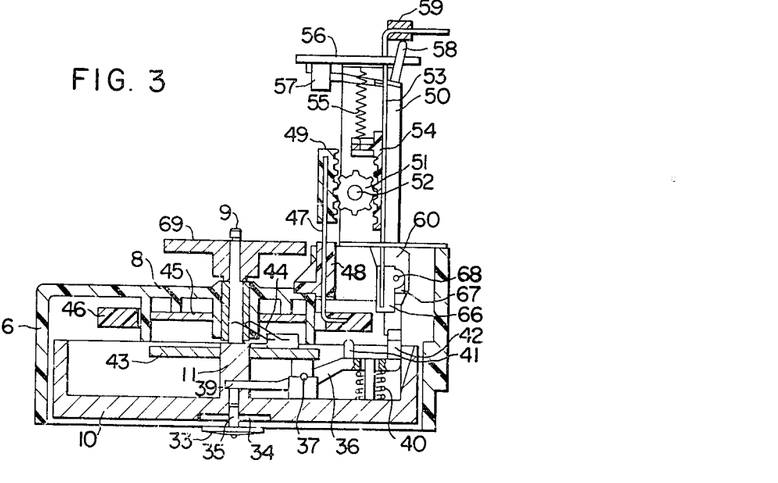
FIGS. 3-8 show cross-sections of the player.
Figure 9:
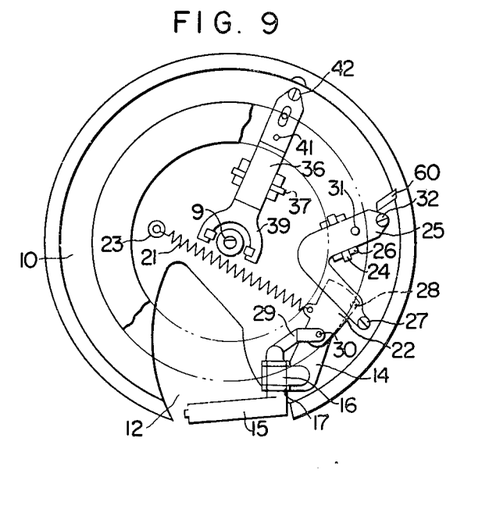

The first embodiment of the invention will be described in detail, hereinafter, with reference to the accompanying drawings. Referring to the drawings FIGS. 1 to 12b, a cylindrical case 1 made of a synthetic resin constitutes the body of the stationary record player of this embodiment. A play button 2, which is attached to the end of a later-mentioned play lever, is mounted on a same side of the case 1 as a volume adjusting dial 3. The record player as a whole is adapted to be placed on a record medium 5 stuck to a carrier paper 4 such as a page of a picture book or the like printed matter. The case 1 is provided at its inner lower side end with a record guide 6 for fitting onto the outer periphery of the record medium 5. Referring specifically to FIG. 2, a bearing assembly 7 is attached to the ceiling 8 of a record guide 6. The bearing assembly 7 rotatably receives a rotary shaft 9. As shown in FIG. 3 a turn table 10 has a shaft 11 connected to the lower end of the rotary shaft 9. As clearly shown in FIG. 9 the turn table 10 has an arcuate opening 12 formed therein, and a projecting boss 13 (FIG. 5) for attaching a pickup assembly in the vicinity of the arcuate opening 12. A pickup support 14 is pivotally secured to the boss 13 for free horizontal swinging movement. The pickup assembly designated at a reference numeral 15 has a rear end journal portion 16 pivoted to a bearng piece 17 provided on the pickup support 14, and a front end portion carrying a stylus 18 and adapted to move to and from a position under the turn table 10, through the arcuate opening 12. A spring 19 is disposed between a tab 20 formed on the journal portion 16 of the pickup assembly 15 and the pickup support 14, so as to bias the pickup 15 toward the position under the turn table 10 through the opening 12. The journal portion 16 has a projection 29 extending, laterally upwardly. Another spring 21 is stretched between a sector-shaped tab 22 and another pin 23 (see FIGS. 9 and 10) on the turn table 10 so as to bias the pickup 15 toward such position that the front end of the latter is just above the leading groove in the record medium 5.

A see-saw member 25 for automatically stopping the operation of the device is rotatably supported by a bearing piece 26 through a shaft 24. A projection 28 formed on the lower surface of the see-saw member 25 normally applies a biasing force under gravity to the tab 22. Reference numerals 27, 32 denote columnar projections having tapers, integrally mounted on the see-saw member 25. Another projection 31 having a hemispherical end is also integrally mounted on the see-saw member 25.

A stop button 33 is mounted so as to freely come into and out of a recess 34 formed in the center portion of the lower surface of the turn table 10. The stop button 33 has a leg 35 which projects above the turn table 10. A stop plate 36 has a central journal portion 37 pivoted to a bearing piece 38 mounted on the upper surface of the turn table 10, and one end having an arcuate portion 39 adapted to cooperate the leg 35 of the stop button 33. A spring 40 disposed between the turn table 10 and the other end of the stop plate 36 is adapted to normally bias the latter upwardly. Projections 41, 42 formed on the upper surface of the other end of the stop plate 36 have a hemispherical end and a tapered end, respectively.

As clearly shown in FIG. 3, a brush attaching plate 43 is fitted onto the shaft 11 of the turn table 10 and has a pair of brushes 44 which are electrically connected to the pickup 15. A slip ring 45 has two conductive bodies which are adapted to be kept in contact with respective one of the brushes 44, and is attached to the ceiling 8 of the record guide 6. A hollow disk-shaped lift plate 46 is disposed above the projections 29, 31 and 41, so as to oppose to the end 30 of the projection 29 formed on the journal portion 16 of the pickup assembly 15, the ends of projection 31 formed on the see-saw member 25 and of the projection 41 formed on the stop plate 41. A lift lever 47 is mounted vertically movably through a bearing body 48 attached to the ceiling of the record guide 6, and is connected at its lower end to the lift plate 46. A rack 49 is connected to the upper end of a lift lever 47.

A chassis 50 attached to the ceiling 8 of the record guide 6 carries a pinion 50 through a shaft 52. The pinion 51 is normally held in engagement with the rack 49. Reference numeral 53 denotes a play bar secured to the chassis 50 so as to be allowed of free vertical movement, and having at its mid portion a rack 54 which engages the pinion 51. A spring 55 stretched between the rack 54 and the chassis 50 is adapted to normally bias the rack 54 and the play bar 53 upwardly. Reference numerals 56 and 57 denote, respectively, a switch lever mounted on the chassis 50 and a power switch. A connecting piece 59 for actuating the switch lever 58 is attached to the upper end of the play lever 53. A heart cam plate 60 is secured to one side surface of the chassis 50 by means of a pin 61 so as to pivot in a vertical plane around the pin 61. A spring 62 retained by the pin 61 is adapted to normally bias the heart cam plate 60 toward the chassis 50. Another spring 63 is stretched by way of the pin 61 between pins 64 and 65 which is respectively secured on the heart cam plate 60 and the chassis 50 so as to bias them toward each other. A drive plate 66 attached to the lower end of the play lever 53, has a pin 68 which is received by a heart cam portion 67 of the heart cam plate 60.

Reference numerals 69, 70 and 71 denote, respectively, a pulley, a motor and an idler by means of which the motor 70 drives the pulley 69.

The lower end of the heart cam plate 60 projects below the ceiling 8 of the record guide 6, and is positioned above the path or locus along which the projections 32, 27 of the see-saw member 25, as well as the projection 42 of the stop plate 36 are moved as the turn table 10 is rotated.

Hereinafter, the operation of the record player having the above construction will be described.

Figure 4:
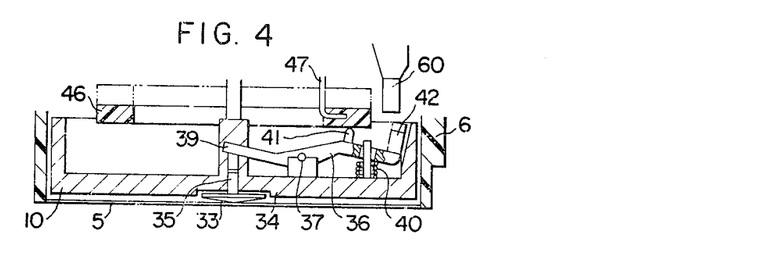
Figure 5:
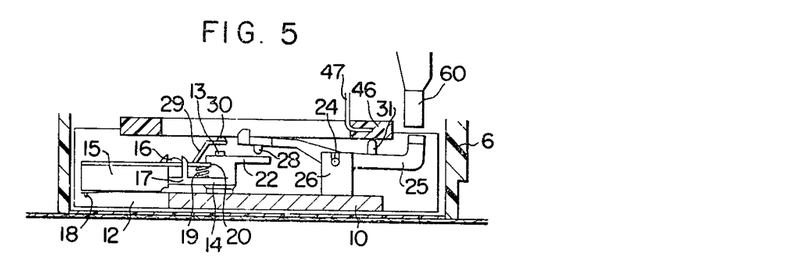

Assuming that the play lever 53 is positioned at the lifted position as shown in FIG. 2, the lift lever 47 is located in the lower position thereof due to the arrangement of the racks 49, 54 and the pinion 51, and is stopped with the rack 49 abutting the bearing body 48. In this state, the connecting piece 59 is not in contact with the switch lever 58 so that the power switch 57 is in the off state to keep the motor 70 not operated. At the same time, since the lift plate 46 is kept at the lower portion, the projection 41 on the stop plate 36, the end 30 of the projection 29 on the journal portion 16 of the pickup 15, and the projection 31 on the see-saw member 25 are all depressed downward by the lift plate 46, as shown in FIGS. 4 and 5. Consequently, the stop plate 36 is kept urged clockwise around the central journal portion 37, as shown in FIG. 4, so that the pickup 15 is completely retracted above the turn table 10, as shown in FIG. 5, that is, the pickup assembly 15 does not project downwardly though the opening 12 of the turn table 10. Further, since the see-saw member 25 is displaced such that its projection 28 is located higher than the sector-shaped tab 22 of the pickup support 14, as shown in FIG. 5, the pickup support 14 is rotatable around the projecting boss 13. Consequently, the pickup support 14 is moved by the force of the spring 21 such that the pickup assembly 15 is moved toward the outermost portion of the turn table, i.e. toward the starting position of the playing.

In this state, as the play button 2 is depressed downward to move the play lever 53 downward, the connecting lever 59 provided on the play lever 53 comes to depress the switch lever 58 downward, so that the power switch 57 is turned on to allow the power supply to feed its power to the motor 70 so as to start the latter. The output torque of the motor 70 is transmitted to the rotary shaft 9 through the idler 71 and the pulley 69 so that the turn table 10 starts to rotate in the direction of arrow in FIG. 2. Then, as the play lever 53 is further depressed, the lift lever 47 is moved upward as shown in FIG. 3, due to the action of racks 54, 49 and the pinion 51. And therefore, the lift plate 46 is moved to the raised position as shown in FIGS. 3 and 6.

Figure 12A:
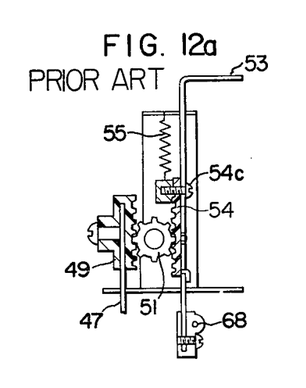
Figure 12B:
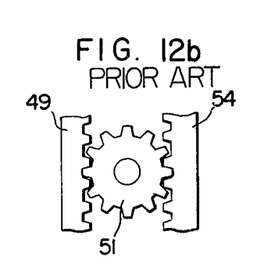

For obtaining a smooth manipulation through means consisting of the racks 54, 49, it is necessary to provide suitable clearances between the meshing gear teeth, i.e. the back-lash. Provided that the first rack 54 is rigidly secured to the play lever 53 by means of screws 54c as shown in FIG. 12a, the lever 53 and the first rack 54 are held at a predetermined position determined by the engagement of the lack pin 68 and the heart cam plate 60 so as to allow a constant stroke. However, because of the presence of the above-mentioned back-lash, it is extremely difficult to obtain a constant meshing condition of the first rack 54 and the pinion 51 with each other. More specifically, referring to FIG. 12b, it may not be determined in which direction the clearance between the first rack 54 and the pinion 51 is narrowed as well as in which direction the clearance between the pinion 51 and the second rack 49 is narrowed. Therefore, it is impossible to obtain a constant displacement of the second rack 49. This adversely affects the precision of the displacement of the lift plate 46 and also the precision of the vertical movement of the pickup assembly 15.

Figures 10, 11B:
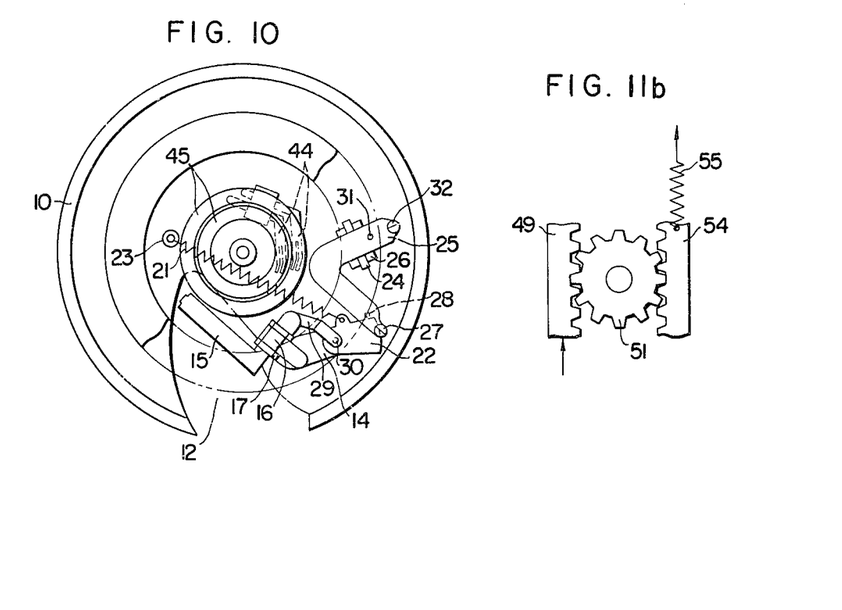
Figure 11A:
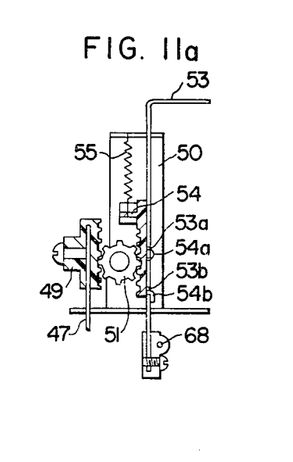

To avoid this, according to the invention, as shown in FIG. 11a, the first rack 54 is not fixed to the play lever 53 by screws but, instead, the pins 54a, 54b of the first rack 54 are loosely received by openings or bores 53a, 53b formed in the play lever 53. Therefore, the first rack 54 lifted is upwardly urged by the spring 55 by a distance corresponding to the play between the pins 54a, 54b and the bores 53a, 53b, while the play lever 53 is held in the constant position determined by the engagement of the lock pin 68 and the heart cam plate 60. In addition, in the rest condition as shown in FIG. 4, the second rack 49 is biased in the same direction as the first rack 54 through the lift plate 46 and the lift lever 47 by the stop plate 36 which in turn is pushed up by the spring 40. Consequently, as shown in FIG. 11b, a constant meshing condition is maintained as shown in FIG. 11b between the racks 54, 49 and the associated pinion 51. Therefore, the back-lash for the upward movement is negated and only the downward back-lash is left. This means that the lift plate 46 is affected only by the downward back-lash, so that the displacement of the lift plate 46 is controlled much more precisely as compared with the case of FIGS. 12a and 12b. By applying biasing forces to the first and the second racks 54, 49 in the same direction, both biasing forces are conveniently negated by each other so that the operation of the play lever 53 does not become heavy.

Figure 6:
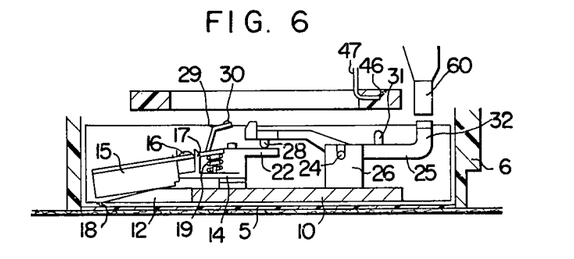

Then, as the lift plate 46 is moved upwardly as shown in FIGS. 3 and 6, the projection 41 of the stop plate 36, end 30 of projection 29 on the journal portion 16 of the pickup, assembly 15 and the projection 31 of the see-saw member 25, which have been depressed by the lift plate 46 are all free from the latter. Therefore, the pickup assembly 15 is allowed to project downwardly through the opening 12 formed in the turn table 10, by the force of the spring 19 so that the stylus 18 is lowered to the starting groove in the record medium 5, as shown in FIG. 6. Meanwhile, the see-saw member 25 is swung counter-clockwise around a fulcrum constituted by the shaft 24 so as to bring the end of the projection 28 into engagement with the upper face of the sector-shaped tab 22 of the pickup support. On the other hand, the stop plate 36 is apt to swing counter-clockwise due to the force of the spring 40. However, when the record medium 5 is positioned beneath the record player 1, the stop plate 36 is kept in the clockwise urged position as shown in FIG. 4, because the stop button 33 is pushed up by the record disc 5.

Therefore, in this state, the projections 27, 32 of the see-saw member 25 and the projection 42 of the stop plate 36 are positioned below the lower end of the heart cam plate 60 so as not to be contacted by the latter even when the turn table 10 is rotated. Therefore, the turn table 10 is allowed to continue its rotation so that the pickup assembly 15, which rotates together with the turn table 10, traces the grooves in the record medium 5, thereby to reproduce the signal recorded on the latter.

The reproduced output from the pickup assembly 15 is then delivered through the brushes 44 and the slip ring 45 to an amplifier (not shown) provided on the printed substrate 56 so as to be amplified by the amplifier. The output from the amplifier is transmitted to the speaker (not shown) attached to the ceiling of the case 1 so as to be changed into an acoustic signal.

This playing condition is held, because the downwardly depressed play lever 53 is locked in the depressed position by the action of the pin 68 and the heart cam portion 67 of the heart cam plate 60. This locking is unlocked by either one of a further depression of the play lever 53 and a movement of the heart cam plate 60 away from the chassis 50. Namely, the play lever 53 and the heart cam plate 60 constitute a so-called push-push mechanism. As the play lever 53 is moved downward, the pin 68 comes to be locked by the heart cam portion 67 so that the play lever 53 is latched at the lowered position. Consequently, the members associated with the play lever 53 are held in the playing condition so that the pickup assembly 15 is rotated together with the turn table 10 so as to continue the playing. As the playing proceeds, the pickup assembly 15 is swung gradually toward the center of the turn table 10.

In this state, the projection 28 formed on the lower surface of the see-saw member 25 is kept in contact with the sector-like tab 22 formed on the pickup support 14. It is possible to negate the radially outward biasing force acting on the pickup assembly 15, i.e. the force of the spring 21 and the centrifugal force attributable to the rotation of the pickup 15, by making use of the mutual contact of the projection 28 and the sector-shaped tab 22. More specifically, the upper surface of the tab 22 upon which the projection 28 rests is tapered so that a radially inward biasing force may be applied to the pickup assembly 15, thereby to negate the radially outward biasing force exerted by the spring 21. At the same time, a small movement of the pickup assembly 15 is effectively damped by the friction between the sector-shaped tab 22 and the projection 28.

Figure 7:
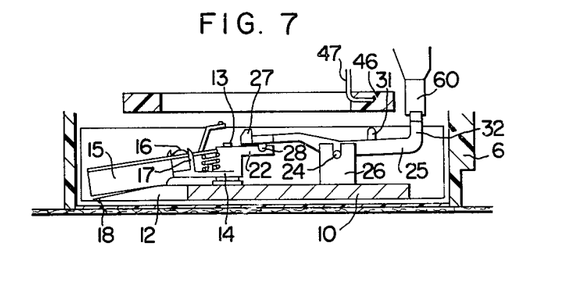
Figure 8:
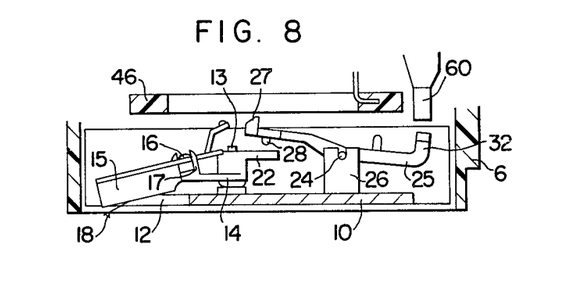

As the playing proceeds, the pickup assembly 15 is moved along the recording groove in the record medium 5 toward the center of the turn table 10, as shown in FIG. 10. When the stylus 18 reaches the final position of playing, the sector-shaped tab 22 has been moved to a position where it cannot enage the projection 28 of the see-saw member 25. Consequently, the see-saw member 25 is swung counter-clockwise around the shaft 24, due to its weight, until the lower surface thereof comes into contact with the upper surface of the sector-shaped tab 22, as shown in FIG. 7. In this state, the see-saw member 25 is inclined. This arrangement ensures that the stylus 18 is allowed to be moved upwardly only after it has been introduced into the lead-out groove beyond the recording groove so that the damaging of the recording groove is avoided due to the lifting of the stylus. At the same time, the columnar projection 32 provided on the see-saw member 25 comes to a position higher than the lower end of the heart cam plate 60. Consequently, the projection 32 is contacted by the lower end of the heart cam plate 60, while the see-saw member 25 makes one rotation together with the turn table 10.

As the lower end of the heart cam plate 60 is pressed by the projection 32, the heart cam plate 60 is swung around the pin 61 away from the chassis 50, so that the pin 68 of the drive plate 66 provided at the lower end of the play lever 53 is disengaged from the heart cam portion 67 of the heart cam plate 60. Consequently, the play lever 53, which has been prevented from moving upward due to the cooperation of the pin 68 and the heart cam portion 67, is moved upward automatically by the force of the spring 55. This in turn causes a downward movement of the lift lever 47, through the action of the racks 54, 49 and the pinion 52. Consequently, the power switch 57 is turned off to stop the power supply to the motor 70 so that the turn table 10 is stopped.

At the same time, the downward movement of the lift plate 46 allows the pickup 15 to move upward away from the record medium. Simultaneously, the see-saw member 25 is moved downward by the lift plate 46 so that the projection 28 on the see-saw member 25 comes to a position above the tab 22 of the pickup support 14. The pickup support 14 is therefore allowed to be moved by the force of the spring 21 so as to bring the pickup assembly 15 to the outer peripheral portion of the turn table 10.

As has been described, as the playing is completed, the power supply is stopped automatically to stop the turn table 10. At the same time, all parts and members of the record player are reset to the starting condition.

This automatic stopping and resetting operation can be effected also when the recorder is accidentally moved away from the record disc 5 during the playing, and when the play button 2 is depressed downward again, as will be seen from the following description.

During the playing, the stop button 33 is pressed upward by the record medium 5 and is held at the raised position as shown in FIG. 4. Consequently, the stop plate 36 is held at the clockwisely swung position, resisting to the force of the spring 40. However, when the record player as a whole is accidentally moved away from the record medium 5, the stop button 33 is free from the pressing force of the record medium 5 so that the stop plate 36 is swung counterclockwise by the force of the spring 40, as shown in FIG. 3. In this state, the stop button 33 is pushed out of the recess 34 of the turn table 10. As the stop plate 36 is swung counterclockwise, the projection 42 provided on the stop plate 36 comes to be positioned higher than the lower end of the heart cam plate 60 so that the lower end of the heart cam plate 60 is contacted by the projection 42 in the course of the rotation of the turn table 10. Therefore, as in the case of the contact of the projection 32 of the see-saw member 25 with the lower end of the heart cam plate 69, the heart cam plate 60 is swung away from the chassis 50, thereby to disengage the pin 68 from the heart cam 67 so that all associated members are reset to the starting condition.

During the playing, the projection 28 formed on the see-saw member 25 rests on the upper face of the tab 22, due to the weight of the see-saw member 25. However, the balance of the weight and force is lost when the record player happens to be inclined, or when an external impacting force is applied so that the see-saw member 25 is swung clockwise around the shaft 24. As a result, the columnar projection 27 comes to be positioned higher than the lower end of the heart cam plate 60. Consequently, the heart cam plate 60 is contacted by the projection 27 of the see-saw member 25, as the latter makes one rotation together with the turn table 10, so as to swing away from the chassis 50, thereby to allow the pin 68 to be disengaged from the heart cam portion 67. Consequently, all of the associated parts and members are reset to the starting condition.

In the described embodiment, the projections 32, 28 of the see-saw member 25, and the projection 42 of the stop plate 36 are tapered so that these projections may not be broken even when the turn table 10 is accidentally rotated in the direction of the arrow in FIG. 2 in the rest condition of the record player.

As has been described, according to the invention, it is possible to automatically reset the parts and members to the starting condition, when the playing of a record medium is over. This resetting to the starting condition is automatically performed also by a further depression of the play button during the playing, by movement of the record player, as a whole, away from the record medium, by turning over the player or by an externally applied impact force.

What is claimed is:

1. A stationary record player having a turn table adapted to be rotatively driven by an electric motor or the like, and a pickup pivotally secured to said turn table, said pickup having a stylus adapted to move along the recording groove in a stationary record medium when said pickup is rotated together with said turn table, so as to reproduce the signal on said record medium, characterized by comprising a lift member adapted to detect the arrival of said stylus at the final position of reproduction, said lift member including a lift lever being pivoted to said turn table, one end of said lift lever being held by the pickup until the pickup reaches a final inward position whereby said one end is released allowing the remaining end of said lift lever to be pivoted upward; a play lever for operating a switch for supplying current to the electric motor in response to an actuation thereof; locking mechanism for maintaining actuation of said play lever; and an automatic release mechanism connected to said locking mechanism, having an activating arm disposed at the same radial position along the turn table as the remaining end of said lift lever and located above the remaining end of the lift lever operated in response to the release of said lift lever whereby said play lever is released stopping said electric motor.

2. The stationary record player as set forth in claim 1, wherein said locking mechanism comprises a heart cam plate holding said play lever in an operating condition, said heart cam plate being on radius above the turn table for engagement with the remaining end of the lift lever when the remaining end is vertically pivoted whereby said play lever is released.

3. A stationary record player having a turn table adapted to be rotatively driven by an electric motor comprising:
   a pickup pivotally secured to the turn table, said pickup having a stylus for engaging a groove in a stationary record medium during rotation of the turn table for generating an electrical signal in response to the record medium;

a stop button biased to project downwardly from the lower surface of said turn table, said stop button being positioned whereby said record medium displaces said stop button;

a stop lever pivoted to said turn table having an end connected to said stop button, said stop lever having a projection on the remaining end, said projection being pivoted in response to the release of the stop button;

a play lever for energizing said motor when actuated; and a heart cam for locking said play lever when said play lever is actuated, said heart cam being positioned over said projection whereby said projection may engage said heart cam when said stop button is not displaced by said record medium thereby releasing said play lever.

4. A stationary record player having a turn table adapted to be rotatively driven by an electric motor or the like, and a pickup pivotally secured to said turn table, said pickup having a stylus adapted to move, as said pickup is rotated together with said turn table, along a recording groove in a stationary record medium so as to reproduce the signal recorded in the latter, characterized by comprising a pickup support by which said pickup is pivotally supported, a spring associated with said pickup support so as to normally bias said pickup toward the outer side of said turn table, and a sector-like tab formed on said pickup support; a lift member bearing a projection at one end, said lift member being pivoted to the turn table so that gravity urges said projection into resilient contact with a surface of said tab, the surface of said tab for contacting said projection being tapered such that when said projection contacts the tapered surface of said tab, said tab and said lift member in combination produce a force for biasing said pickup toward the inner side of said turn table, thereby overcoming the outward biasing force exerted by said spring and the centrifugal force acting on said pickup caused by the rotation of the latter.

5. A stationary record player as set forth in claim 4, characterized in that said tab surface permits said lift member to pivot when said stylus has been brought to the lead-out groove of said record medium.

6. A stationary record player having a turn table adapted to be rotatively driven by an electric motor, and a pickup pivotally secured to said turn table, said pickup having a stylus adapted to be moved as said pickup is rotated together with said turn table, along the recording groove in a stationary record medium, so as to reproduce the signal recorded in said record medium, characterized by comprising a play lever disposed movably and biased in one direction for operating a switch for energizing said motor, a locking mechanism adapted to lock said play lever in a playing state as said play lever is depressed against the biasing force and to release said play lever as the latter is subsequently depressed so as to allow said play lever to be reset to the initial state, and a reversing transmission mechanism coupled to the play lever for providing mechanical motion reverse to the motion experienced by said play lever, and means for raising and lowering said pickup onto the surface of said record medium comprising a lift plate and see-saw member, said lift plate being located vertically above said pickup and see-saw member, said lift plate being coupled to said transmission whereby when said play lever is locked in the playing state said lift plate is raised and said see-saw member releases said pickup whereby said pickup is lowerred, and said pickup is raised away from said surface of said record medium by the lowering of said lift plate into contact with said see-saw member which forces said pickup to pivot as said play lever is reset to said initial state by said locking mechanism.

7. A stationary record player as set forth in claim 6, wherein said reversing transmission mechanism includes a first rack adapted to be moved linearly together with said play lever, a pinion engaging said first rack and adapted to be rotated by said first rack, and a second rack engaging said pinion and adapted to be moved linearly in the direction opposite to the movement of said first rack, a coupling member connecting said second rack to said lift plate, whereby said stylus is lifted from the record medium during movement of said second rack.

8. A stationary record player as set forth in claim 7, characterized in that said first rack is connected to said play lever movably relatively to said play lever, that said first rack is biased in one direction of its movement, and that said second rack is biased, at least in the rest state of said record player, in the same direction as said first rack.

9. A stationary record player having a turn table adapted to be rotatively driven by an electric motor or the like, and a pickup pivotally secured to said turn table, said pickup carrying a stylus adapted to be moved, as said pickup is rotated together with said turn table, along the recording groove in a stationary record medium, so as to reproduce the signal recorded on the latter, characterized by comprising a lift member pivoted to said turn table having a first end which is held in a first position by said pickup, said one end being released by said pickup at the final position of reproduction whereby a second end of said lift member is pivotally brought into contact with a means for inhibiting the driving of said turn table.

10. The stationary record player in claim 9, wherein said means for inhibiting comprises a heart cam plate for releasing a switch, said switch being serially connected with said motor.

* * * * *